(12) United States Patent
Brown et al.

(10) Patent No.: US 8,145,896 B2
(45) Date of Patent: Mar. 27, 2012

(54) SYSTEM AND METHOD FOR IMPLEMENTING AN ENHANCED TRANSPORT LAYER SECURITY PROTOCOL

(75) Inventors: Michael S. Brown, Waterloo (CA); Herbert A. Little, Waterloo (CA); David P. Yach, Waterloo (CA)

(73) Assignee: Research In Motion Limited, Waterloo, Ontario (CA)

( * ) Notice: Subject to any disclaimer, the term of this patent is extended or adjusted under 35 U.S.C. 154(b) by 183 days.

(21) Appl. No.: 12/632,432

(22) Filed: Dec. 7, 2009

(65) Prior Publication Data

US 2010/0088504 A1 Apr. 8, 2010

Related U.S. Application Data

(62) Division of application No. 10/362,178, filed as application No. PCT/CA01/01216 on Aug. 24, 2001, now Pat. No. 7,631,180.

(60) Provisional application No. 60/227,946, filed on Aug. 25, 2000.

(51) Int. Cl.
*H04L 29/06* (2006.01)
(52) U.S. Cl. ...................................................... 713/151
(58) Field of Classification Search .................. 713/151, 713/168; 726/14; 380/270
See application file for complete search history.

(56) References Cited

U.S. PATENT DOCUMENTS

| | | | |
|---|---|---|---|
| 5,928,323 A | 7/1999 | Gosling et al. | |
| 6,128,738 A | 10/2000 | Doyle et al. | |
| 6,665,530 B1 | 12/2003 | Broyles et al. | |
| 6,665,721 B1 | 12/2003 | Hind et al. | |
| 6,868,406 B1 | 3/2005 | Ogg et al. | |
| 7,043,456 B2 * | 5/2006 | Lindskog et al. | 705/76 |
| 7,287,271 B1 * | 10/2007 | Riggins | 726/3 |
| 2001/0020274 A1 * | 9/2001 | Shambroom | 713/201 |
| 2002/0046286 A1 | 4/2002 | Caldwell et al. | |
| 2002/0069273 A1 | 6/2002 | Bryant et al. | |

(Continued)

FOREIGN PATENT DOCUMENTS

WO 9855930 12/1998

(Continued)

OTHER PUBLICATIONS

Jormalainen, S. and Laine, J.: Security in the WTLS, Computer Science and Engineering, Nov. 3, 1999.

(Continued)

*Primary Examiner* — Jason Gee
(74) *Attorney, Agent, or Firm* — Perry+Currier Inc.

(57) ABSTRACT

A system and method for implementing an enhanced transport layer security (ETLS) protocol is provided. The system includes a primary server, an ETLS servlet and an ETLS software module. The primary server operates on a computer network and is configured to communicate over the computer network using a non-proprietary security protocol. The ETLS servlet also operates on the computer network and is securely coupled to the primary server. The ETLS servlet is configured to communicate over the computer network using an ETLS security protocol. The ETLS software module operates on a mobile device, and is configured to communicate over the computer network using either the non-proprietary security protocol or the ETLS security protocol. Operationally, the ETLS software module initially contacts the server over the computer network using the non-proprietary security protocol, and subsequently contacts the server through the ETLS servlet using the ETLS security protocol.

20 Claims, 5 Drawing Sheets

U.S. PATENT DOCUMENTS

| | | | |
|---|---|---|---|
| 2002/0129236 | A1 | 9/2002 | Nuutinen |
| 2003/0038707 | A1 | 2/2003 | Geller |
| 2003/0203732 | A1 | 10/2003 | Eerola |

FOREIGN PATENT DOCUMENTS

| | | |
|---|---|---|
| WO | 0011832 | 3/2000 |

OTHER PUBLICATIONS

Article 96(2) EPC Communication, issued Mar. 2, 2007 by EPO, for European Application No. EP04028615.

"Handbook of Applied Cryptography", p. 397-399, XP002296840 (date unknown).

* cited by examiner

SYSTEM AND METHOD FOR IMPLEMENTING AN ENHANCED TRANSPORT LAYER SECURITY PROTOCOL

CROSS-REFERENCE TO RELATED APPLICATION

This application is a divisional application of U.S. patent application Ser. No. 10/362,178, entitled "System and Method for Implementing an Enhanced Transport Layer Security Protocol," filed on Feb. 19, 2003, which is a national stage entry of PCT Application PCT/CA01/01216, filed on Aug. 24, 2001, which claims priority to "Enhanced Transport Layer Security Handshake For Mobile Communication Devices," U.S. Provisional Application No. 60/227,946, filed Aug. 25, 2000. Each of these prior applications is herein incorporated by reference in their entirety.

BACKGROUND

1. Field of the Invention

This invention relates generally to the field of computer network security protocols. More particularly, the invention provides an enhanced transport layer security ("ETLS") protocol that is especially well-suited for use with mobile communication devices, such as Personal Digital Assistants, cellular telephones, and wireless two-way e-mail communication devices (collectively referred to hereinafter as "mobile devices").

2. Description of the Related Art

Security protocols for establishing a secure connection to a computer network, such as the Internet, are known. A security protocol commonly used to securely connect to an Internet host is the Transport Layer Security ("TLS") protocol, which was formerly known as the Secure Socket Layer ("SSL") protocol.

FIG. 1 is a signal flow diagram 10 illustrating the basic steps typically used to establish a secure connection between a client 12 and an Internet server 14 using the TLS protocol. In step 16, an initial datagram is transmitted from the client 12 to the server 14 to establish contact and to identify the algorithms or languages that the client 12 is capable of supporting. Once the initial datagram is received, the server 14 typically accepts the connection and replies with a datagram that identifies the algorithms or languages that the server will support (step 18). In addition the reply datagram from the server 14 typically includes a public key in a digital certificate that authenticates the identity of the server 14.

The digital certificate is generally acquired from a trusted third-party, such as VeriSign™ or some other certificate authority, which verifies that the public key belongs to the server 14. In addition, the public key typically has an associated private key that is maintained only by the server 14, whereby data encrypted with the public key can only be decrypted using the private key.

In steps 20 and 22, the client 12 negotiates a session key with the server 14. The session key is typically a random number generated by the client 12 that is used for only one fetch-response operation between the client 12 and server 14. The random session key is typically first used to encrypt some random data as "proof of the key." The session key and the data are then encrypted with the public key and transmitted to the server in step 20. The session key and "proof of key" data are decrypted by the server using its private key. The "proof of key" data is then further decrypted with the session key. Then, in step 22, the server typically transmits the "proof of key" data back to the client 12 to establish that it has properly received and decrypted the session key.

Once the TLS public key has been exchanged and a session key has been negotiated, a secure TLS socket is established, and application data may be securely transmitted between the client 12 and server 14 using the session key (step 24). By utilizing this four-pass handshake between a client and a server each time a communication is initiated, the TLS protocol ensures both the authenticity of the server and the originality of the transmission. For example, to illustrate the importance of originality, if a user has communicated with a bank server via a client to electronically transfer money from an account, the four-pass TLS handshake prevents the transfer operation from being repeated by "replaying" the same encrypted message from either the same client or another client if the communication was intercepted.

Although the TLS protocol provides a secure connection to a server, this protocol is not well-suited for mobile applications because the datagrams transferred in the TLS four-pass handshake typically contain a relatively large amount of data that cannot be quickly transferred over a wireless network.

Therefore, in order to reduce the number of datagrams transferred over the wireless network, mobile applications commonly utilize a Wireless Application Protocol ("WAP") to establish a secure connection with an Internet server.

FIG. 2 is a block diagram illustrating a typical mobile communication system 30 utilizing the Wireless Application Protocol (WAP). In this system 30, a service request from a mobile device 32 that is addressed to a server 34 is encoded using a Wireless Transport Layer Security (WTLS) protocol and transmitted through a wireless gateway 36 to a WAP Gateway 38, which typically acts as a proxy to the Internet. The wireless gateway and WAP gateway may or may not be co-located. Typically, the WAP Gateway 38 has its own digital certificate, signed by a trusted third-party that is used by the mobile device 32 to validate its authenticity. Once the WTLS-encrypted service request is received, the WAP Gateway 38 generally establishes a TLS connection over the Internet with the server 34. The service request is then decrypted by the WAP Gateway 38, re-encrypted using the TLS protocol and sent over the Internet to the server 34. To respond to the service request, the server 34 typically transmits TLS-encrypted data to the WAP Gateway 38, which is then decrypted and re-encrypted using the WTLS protocol and transmitted to the mobile device 32. Although this system 30 is typically faster than the TLS protocol for mobile applications, it leaves a gap in the secure link, thereby risking that data may be intercepted while it is in plaintext format in the WAP Gateway 38.

SUMMARY

A system and method for implementing an enhanced transport layer security (ETLS) protocol is provided. The system includes a primary server, an ETLS servlet and an ETLS software module. The primary server operates on a computer network and is configured to communicate over the computer network using a non-proprietary security protocol. The ETLS servlet also operates on the computer network and is securely coupled to the primary server. The ETLS servlet is configured to communicate over the computer network using an ETLS security protocol. The ETLS software module operates on a mobile device, and is configured to communicate over the computer network using either the non-proprietary security protocol or the ETLS security protocol. Operationally, the ETLS software module initially contacts the server over the computer network using the non-proprietary security protocol, and subsequently contacts the server through the ETLS servlet using the ETLS security protocol.

DETAILED DESCRIPTION

Figure 3:
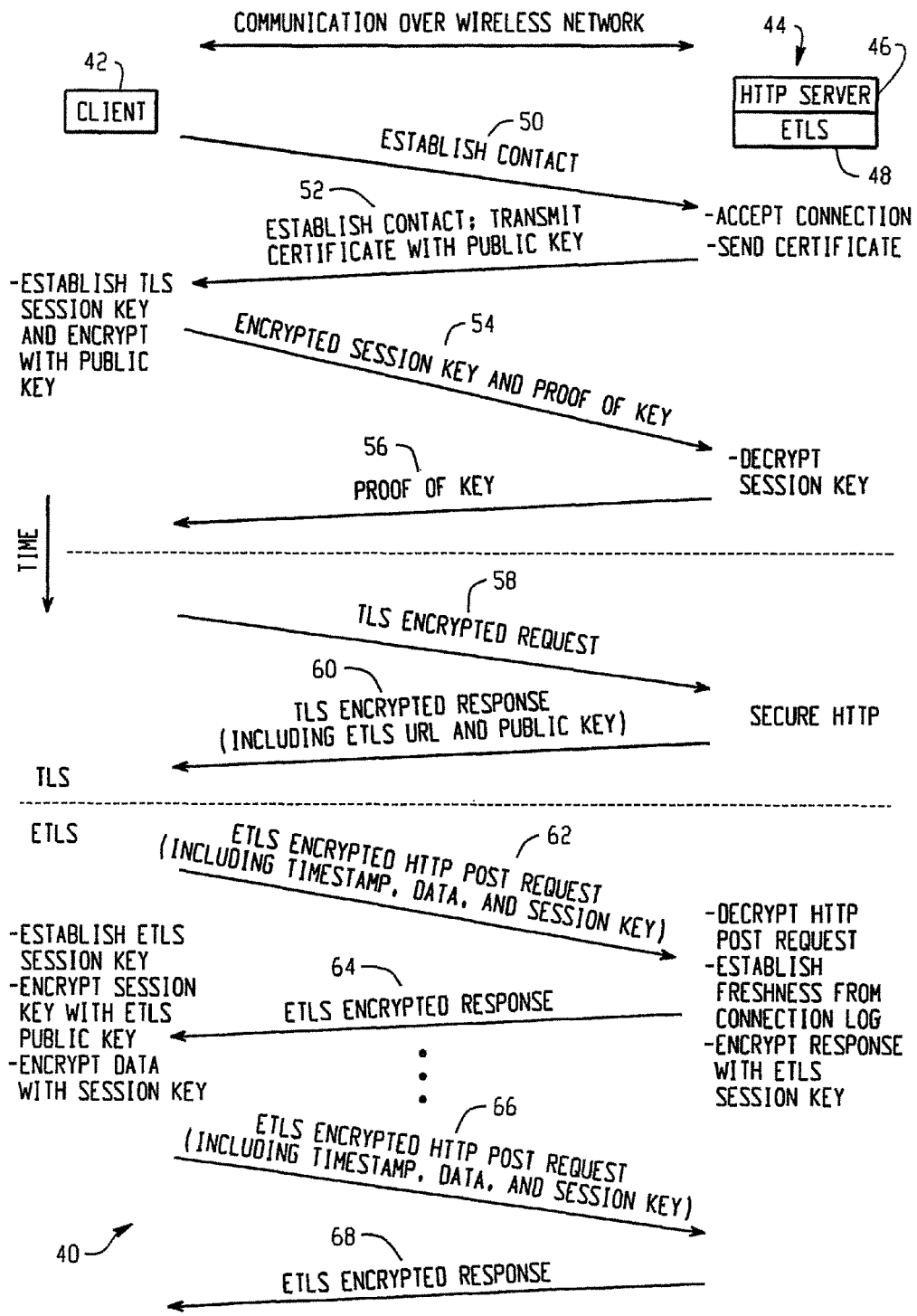
FIG. 3 is a signal flow diagram illustrating a wireless communication between a client and a server using an enhanced transport layer security ("ETLS") protocol.
Figure 4:
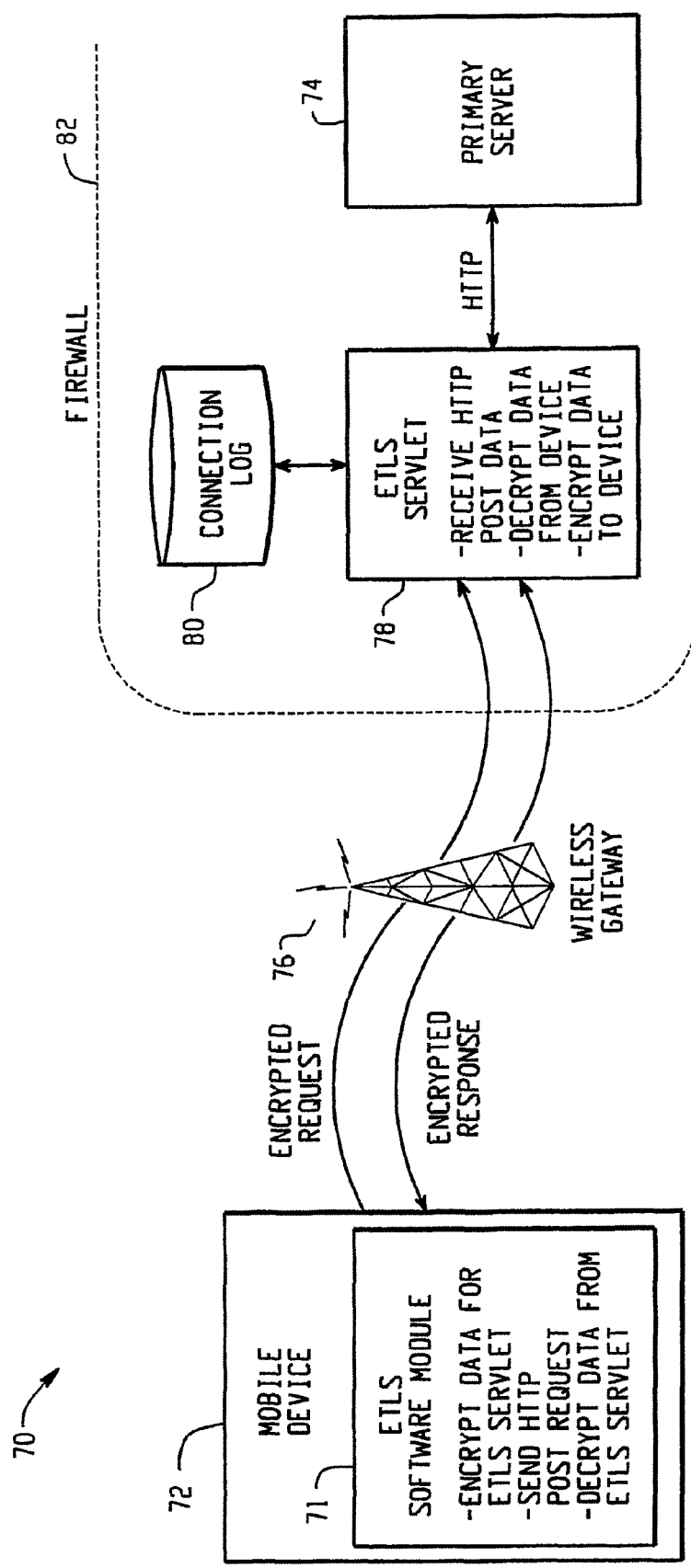
FIG. 4 is a block diagram of an exemplary ETLS system illustrating a secure connection between a mobile device and an HTTP server using the ETLS protocol.

Referring now to the remaining drawing figures, FIG. 3 is a signal flow diagram 40 illustrating a wireless communication between a client 42 and a server 44 using an enhanced transport layer security ("ETLS") protocol. The client 42 may be any system operating on a mobile device that is capable of wirelessly accessing a computer network. The server 44 preferably includes a primary server, such as an HTTP server 46, and an ETLS servlet 48, both operating on a computer network, such as the Internet. The ETLS servlet 48, discussed in more detail below with reference to FIG. 4, is preferably a JAVA™ servlet operating on the HTTP server 46, but could alternatively be some other server-side mechanism such as a CGI script. The ETLS servlet 48 is preferably installed on the HTTP server 46 with its own uniform resource locator (URL), which is added to a custom HTTP response header along with an ETLS public key.

In step 50, the client 42 attempts to open a secure connection with the server 44. At this point, the client 42 has not yet detected the ETLS servlet 48, and, therefore, uses a non-proprietary security protocol such as the TLS protocol.

Figure 1:
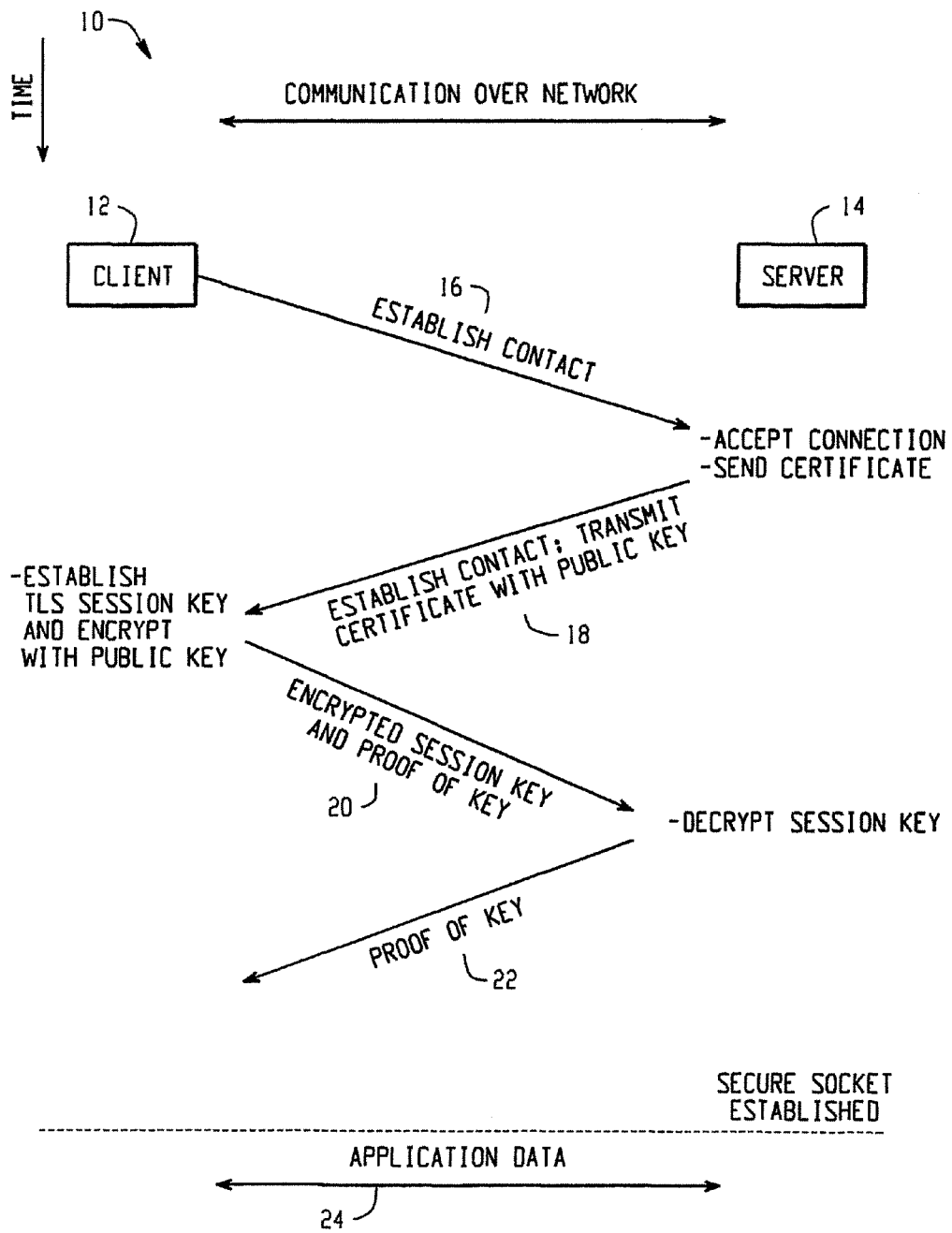
FIG. 1 is a signal flow diagram illustrating the basic steps typically used to establish a secure connection between a client and an Internet server using the TLS protocol.
Figure 2:
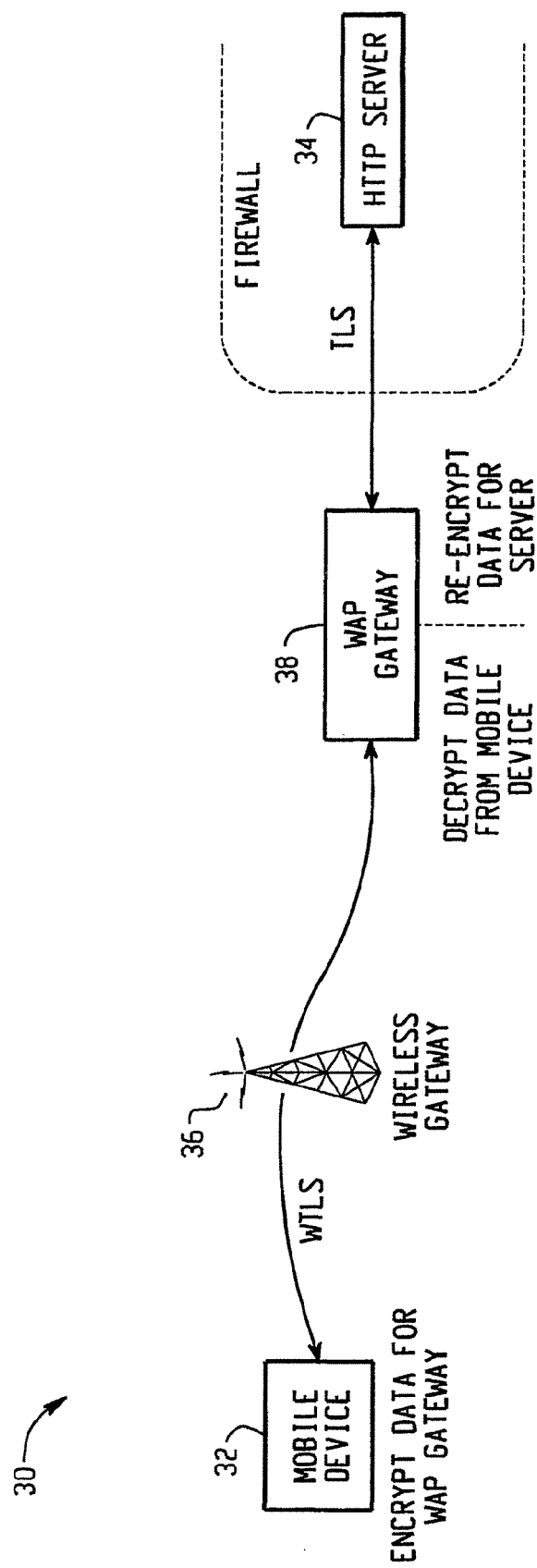
FIG. 2 is a block diagram illustrating a typical mobile communication system utilizing a Wireless Application Protocol (WAP)

The TLS four-pass handshake, discussed above with reference to FIG. 1, is performed in steps 50-56. In steps 50 and 52, the client 42 and the server 44 determine which operations or languages they have in common, and a TLS public key in a digital certificate is transferred to the client 42. In steps 54 and 56, a random TLS session key is negotiated. Then, in step 58 the initial service request from the client 42 is encrypted with the TLS session key and transmitted to the HTTP server 46. The HTTP server 46 decrypts the service request and transmits its initial encrypted response in step 60. Along with the encrypted data, the initial response 60 from the HTTP server 46 also includes the custom HTTP response header with the URL of the ETLS servlet 48 and the ETLS public key. The ETLS public key is preferably generated by the ETLS servlet 48, and has an associated ETLS private key that is maintained exclusively by the ETLS servlet 48. The client 42 preferably stores the ETLS public key and associated URL in a memory location on the mobile device. Thereafter, each time the client 42 establishes a secure connection to the server 44, it uses the ETLS public key and associated URL to communicate through the ETLS servlet 48.

Steps 62-68 illustrate two secure ETLS transmissions between the client 42 and the server 44 after the ETLS public key and associated URL have been received and stored by the client 42. To establish a secure connection using the ETLS protocol, the client 42 first establishes a random ETLS session key and encrypts it with the ETLS public key received from the custom HTTP response header. The client 42 then uses the ETLS session key to encrypt the bulk data that makes up its service request to the server 44 and also to encrypt a digital time-stamp. In step 62, the client 42 transmits the data to the ETLS servlet, preferably in the form of an HTTP POST request that includes the encrypted session key, service request and time-stamp. Once the ETLS servlet 48 has received the HTTP POST request, the request is decrypted and compared to a connection log to establish that the transmission is original. At this point, the security of the communication has been established, and the ETLS servlet 48 may perform a fetch-response operation with the HTTP server 46. Then, once a response from the HTTP server 46 has been returned, the ETLS servlet 48 encrypts the response with the ETLS session key and transmits it to the client 42 in step 64. The ETLS protocol, including the operations of the digital time-stamp and the connection log, are discussed in more detail below with reference to FIG. 4.

Steps 66 and 68 illustrate that each subsequent communication between the client 42 and the server 44 may be performed using the same two-step ETLS handshake described above with reference to steps 62 and 64. In this manner, the ETLS protocol enables secure communications between a mobile device and an Internet server without requiring the lengthy, multiple transmissions commonly associated with non-proprietary security protocols, such as the TLS protocol.

FIG. 4 is a block diagram of an exemplary ETLS system 70 illustrating a secure connection between a mobile device 72 and a primary server 74 using the ETLS protocol. Cross-referencing FIGS. 3 and 4, the ETLS system 70 shown in FIG. 4 illustrates the ETLS connections made in steps 62-68 of FIG. 3, and after the initial TLS connection shown in steps 50-60 of FIG. 3. The ETLS system 70 includes the mobile device 72, the primary server 74, a wireless gateway 76, the ETLS servlet 78 and the connection log 80. The primary server 74, ETLS servlet 78 and connection log 80 are located on a computer network, such as the Internet, and are preferably protected behind a common firewall 82. Communications between the mobile device 72 and the computer network are preferably made through the wireless gateway 76 using any known Web browser-type software designed for use on a mobile device. The mobile device 72 preferably also includes an ETLS software module 71 that is configured to establish a secure connection with the computer network using either the ETLS protocol or a non-proprietary security protocol such as the TLS protocol.

To send a service request to the primary server 74 using the ETLS protocol, the mobile device 72 preferably establishes a random ETLS session key that it uses to encrypt the service request, and encrypts the session key using the stored ETLS public key for the ETLS Servlet 78. In addition, to protect against "rep, lay" communications, an electronic time-stamp is also preferably generated by the mobile device and encrypted using the ETLS session key. Then, the encrypted service request, session key and time-stamp are all bundled in an HTTP POST request, or some other suitable transfer mechanism, and transmitted through the wireless gateway 76 to the ETLS servlet 78.

When the HTTP POST request is received at the ETLS servlet 78, the ETLS session key is preferably decrypted with the ETLS private key that is maintained by the ETLS servlet 78. The ETLS session key is then used by the ETLS servlet 78 to decrypt the service request and time-stamp. Preferably, a digital certificate from the primary server 74 was received and stored by the mobile device 72 when it first contacted the primary server 74 using a non-proprietary security protocol. Therefore, the identity of the primary server 74 has already been verified. The link is not yet secure, however, because a multi-pass handshake, such as the TLS handshake, was not used to negotiate the ETLS session key and establish that the transmission is original. The ETLS servlet 78 thus preferably protects against "replay" communications by comparing the decrypted service request and time-stamp with previous transmissions stored in the connection log 80. In this manner, if the ETLS servlet 78 receives an encrypted HTTP POST request that includes a service request and time-stamp that is identical to that of a previous transmission stored in the communication log, then the servlet 78 will recognize that the service request is not an original communication, and will preferably ignore the service request. In a preferred embodiment, the communication log stores all of the service requests and time-stamps received by the ETLS servlet 78 within a pre-determined time period. Alternatively, the ETLS servlet 78 may save only the time-stamps or some other data, such as an ordinal number, indicating the originality of the transmission.

Once the HTTP POST request has been decrypted by the ETLS servlet 78 and compared with the previous transmissions stored in the connection log 80, a secure link between the mobile device and the ETLS servlet 78 has been established. The decrypted service request may then be transmitted from the ETLS servlet 78 to the primary server 74, which performs the desired operation and returns a response to the ETLS servlet 78. Because the ETLS servlet 78 and the primary server 74 operate behind the common firewall 82, the non-encrypted data may be securely transferred using a standard transfer protocol, such as HTTP. Once the response from the primary server 74 is received by the ETLS servlet 78, it is encrypted with the ETLS session key and transmitted through the wireless gateway 76 to the mobile device 72. At the mobile device 72, the response is decrypted with the session key. Then, if a new service request is desired, a new session key may be generated by the mobile device 72, and the above described process repeated.

Figure 5:
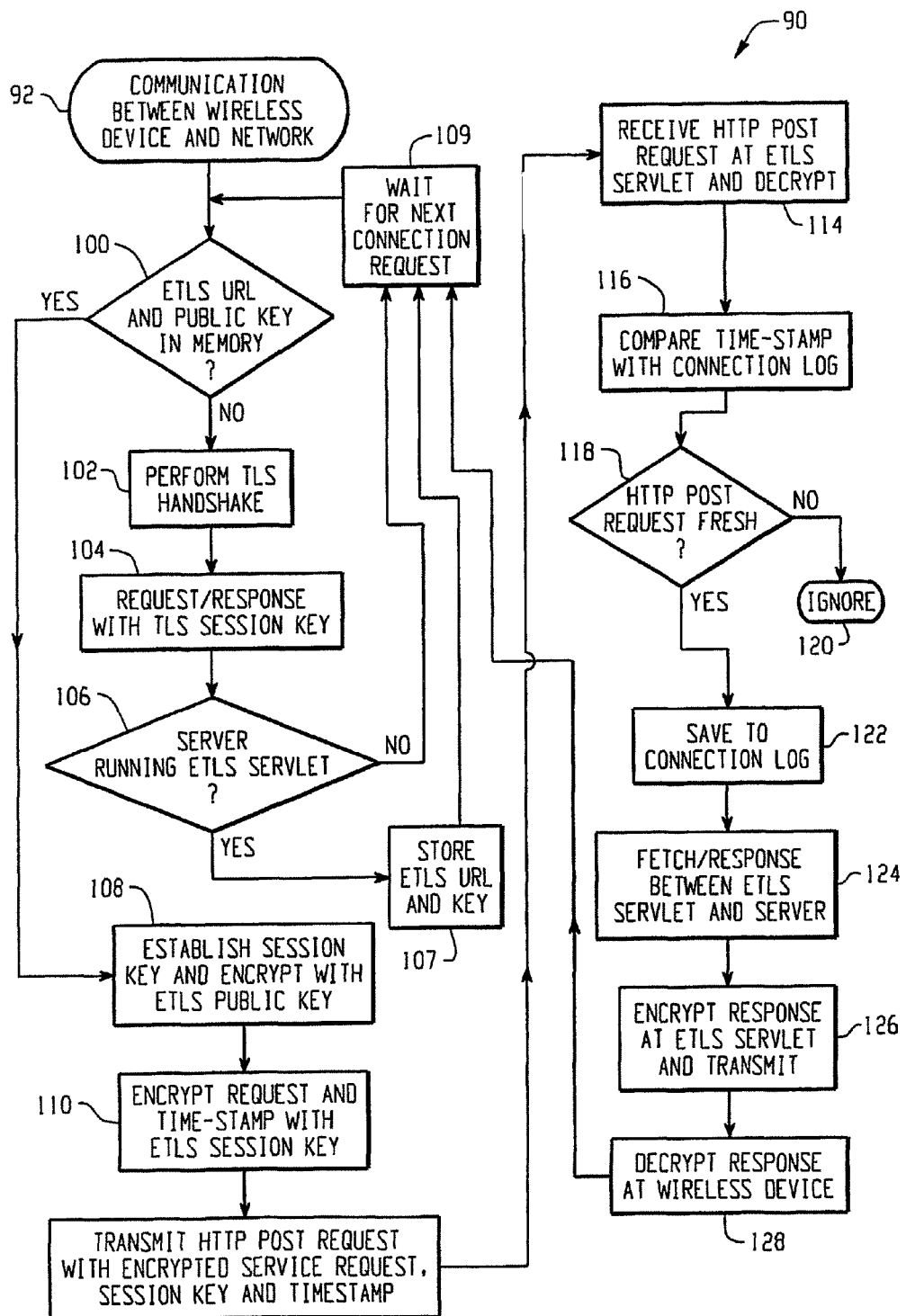
FIG. 5 is a flow diagram of an exemplary method for securely communicating between a mobile device and a network server using the ETLS protocol.

FIG. 5 is a flow diagram of an exemplary method for securely communicating between a mobile device and a network server using the ETLS protocol. The method begins at step 92 in which communication is established between a mobile device and a network server operating on a computer network such as the Internet. Once communication with the computer network has been established, the mobile device preferably accesses an internal memory location at step 100 to determine if an ETLS public key and an ETLS servlet URL have previously been saved for the particular network server. If so, then the mobile device recognizes that a secure link may be established using an ETLS servlet operating in connection with the server, and an ETLS handshake is performed starting at step 108. If the mobile device does not have a stored ETLS URL and public key for the server, however, then a secure socket should preferably be opened with the server using a non-proprietary security protocol, such as the TLS protocol (step 102). After a secure socket has been negotiated with the server, the mobile device may then send an encrypted service request to which the server may respond with an encrypted TLS response (step 104). If the server is equipped with an ETLS servlet (step 106), then the TLS response sent by the server in step 104 will preferably include a custom HTTP response header that identifies the ETLS public key and the associated URL for the ETLS servlet, which is stored on the device in step 107. The device then waits for a request for the next connection at step 109. If the server is not equipped with an ETLS servlet (step 106), however, the device preferably waits until the device requests the next connection at step 109.

At step 108, the mobile device preferably begins the ETLS handshake by generating a session key and encrypting it with the ETLS public key previously received from the server in the custom HTTP response header. At step 110, the service request from the mobile device and a digital time-stamp are both encrypted using the session key (step 110). The digital time-stamp preferably includes the time and date that the transmission takes place. Then, at step 112, the encrypted service request, time-stamp and session key are transmitted to the ETLS servlet, preferably in the form of an HTTP POST request or some other suitable transfer mechanism.

When the HTTP POST request is received by the ETLS servlet, the ETLS session key is decrypted using a private key maintained exclusively by the ETLS servlet, and the decrypted session key is then used to decrypt the service request and digital time-stamp (step 114). At step 116, the digital time-stamp is compared with those of previous transmissions stored in a connection log that is maintained by the ETLS servlet. If the time-stamp matches that of a previous transmission stored in the connection log, then the transmission is not original (step 118), and the service request is preferably ignored by the ETLS servlet (step 120). If the transmission is original (step 118), however, then the digital time-stamp is saved to the connection log (step 122) to prevent the transmission from being "replayed" in subsequent communications. In alternative embodiments, both the time-stamp and service request may be stored in the connection log and compared with the HTTP POST request, or the time-stamp may be replaced with some other means for determining that the request is original, such as an ordinal number.

In step 124, a secure link has been established and a fetch-response operation is performed between the ETLS servlet and the server to perform the function indicated in the service request from the mobile device. Then, in step 126 the response from the server is encrypted by the ETLS servlet using the session key and is transmitted to the mobile device. The response is decrypted by the mobile device at step 128, and a new service request may then be initiated by the mobile device at step 109.

The embodiments described herein are examples of structures, systems or methods having elements corresponding to the elements of the invention recited in the claims. This written description may enable those skilled in the art to make and use embodiments having alternative elements that likewise correspond to the elements of the invention recited in the claims. The intended scope of the invention thus includes other structures, systems or methods that do not differ from the literal language of the claims, and further includes other structures, systems or methods with insubstantial differences form the literal language of the claims.

The invention claimed is:

1. A method for securely communicating between a mobile device and a server operating on a computer network, the method comprising:

providing a security servlet operating on the computer network, wherein the security servlet communicates with the server via a secure link, and is identified by a unique location on the computer network;

establishing a wireless connection between the mobile device and the computer network;

establishing a secure connection between the mobile device and the server using a non-proprietary security protocol;

sending a first encrypted service request from the mobile device to the server via the non-proprietary security protocol;

sending a first encrypted response from the server to the mobile device that includes the unique location of the security servlet on the computer network;

sending a second encrypted service request from the mobile device to the security servlet using the unique location of the security servlet;

decrypting the second encrypted service request with the security servlet to generate a decrypted service request; and transferring the decrypted service request from the security servlet to the server.

2. The method of claim 1, wherein the second encrypted service request is encrypted using a proprietary security protocol.

3. The method of claim 1, further comprising:
storing the unique location of the security servlet in a memory location on the mobile device.

4. The method of claim 1, further comprising:
receiving a digital certificate from the server using the non-proprietary security protocol.

5. The method of claim 1, wherein the unique location of the security servlet on the computer network comprises a uniform resource locator (URL).

6. The method of claim 1, wherein the non-proprietary security protocol is the Transport Layer Security (TLS) protocol.

7. The method of claim 1, wherein the non-proprietary security protocol is the Secure Socket Layer (SSL) protocol.

8. The method of claim 1, wherein the first encrypted response from the server includes a custom HTTP response header that identifies the unique location of the security servlet on the computer network.

9. The method of claim 1, wherein the decrypted service request is transferred from the security servlet to the server using a hypertext transfer protocol (HTTP) connection.

10. The method of claim 1, wherein a plurality of additional encrypted service requests are sent from the mobile device to the security servlet, decrypted by the security servlet and transferred to the server.

11. The method of claim 1, further comprising:
verifying originality of the second encrypted service request by comparing it with a connection log maintained by the security servlet.

12. The method of claim 1, wherein an encrypted current time-stamp is sent from the mobile device to the security servlet along with the second encrypted service request, wherein the method further comprises:
verifying the originality of the second encrypted service request by decrypting the encrypted current time-stamp and comparing it with a connection log maintained by the security servlet.

13. The method of claim 1, wherein the wireless connection between the mobile device and the computer network is made through a wireless network.

14. The method of claim 1, wherein:
the first encrypted response from the server also includes a public key;
the security servlet has a private key configured to decrypt data that has been encrypted using the public key; and
the second encrypted service request is encrypted by the mobile device using the public key, and is decrypted by the security servlet using the private key.

15. The method of claim 14, wherein sending the second encrypted service request from the mobile device to the security servlet comprises:
generating a session key;
encrypting a service request with the session key;
encrypting the session key with the public key;
encapsulating the encrypted service request and the encrypted session key according to a transfer mechanism to form the second encrypted service request; and
transmitting the second encrypted service request from the mobile device to the security servlet;
wherein the encrypted session key is decrypted by the security servlet using the private key and the encrypted service request is decrypted by the security servlet using the session key, and wherein the service request is transferred from the security servlet to the server.

16. The method of claim 14, wherein a current time-stamp is also encrypted with the session key and encapsulated in the second encrypted service request, and wherein the current time-stamp is compared with a connection log by the security servlet to verify the originality of the second encrypted service request.

17. The method of claim 15, wherein the second encrypted service request is sent to the security servlet in the form of an HTTP POST request.

18. The method of claim 15, further comprising:
generating a response to the service request at the server;
transferring the response from the server to the security servlet;
encrypting the response using the session key; and
sending the encrypted response from the security servlet to the mobile device.

19. A system for securely communicating between a mobile device and a server operating on a computer network, the system comprising:
a data processor; and
a computer-readable memory;
the computer readable memory being encoded with instructions for commanding the data processor to perform steps comprising:
providing a security servlet operating on the computer network, wherein the security servlet communicates with the server via a secure link, and is identified by a unique location on the computer network;
establishing a wireless connection between the mobile device and the computer network;
establishing a secure connection between the mobile device and the server using a non-proprietary security protocol;
receiving a first encrypted service request from the mobile device to the server via the non-proprietary security protocol;
sending a first encrypted response from the server to the mobile device that includes the unique location of the security servlet on the computer network;
receiving a second encrypted service request from the mobile device to the security servlet using the unique location of the security servlet;
decrypting the second encrypted service request with the security servlet to generate a decrypted service request; and
transferring the decrypted service request from the security servlet to the server.

20. A server for securely communicating with a mobile device over a computer network, the server comprising:
a memory for maintaining a security servlet and a primary server, wherein the security servlet communicates with the primary server via a secure link, and is identified by a unique location on the computer network;

a processor configured to establish a secure connection between the mobile device and the server using a non-proprietary security protocol;

the processor further configured to receive a first encrypted service request from the mobile device to the primary server via the non-proprietary security protocol;

the processor further configured to send a first encrypted response from the primary server to the mobile device that includes the unique location of the security servlet on the computer network;

the processor further configured to receive a second encrypted service request from the mobile device to the security servlet using the unique location of the security servlet;

the processor further configured to decrypt the second encrypted service request with the security servlet to generate a decrypted service request; and the processor further configured to transfer the decrypted service request from the security servlet to the primary server.

* * * * *